(12) United States Patent
Barth et al.

(10) Patent No.: US 6,535,115 B1
(45) Date of Patent: Mar. 18, 2003

(54) AIR BAG HAVING EXCESSIVE EXTERNAL MAGNETIC FIELD PROTECTION CIRCUITRY

(75) Inventors: Thomas H. Barth, Toulouse (FR); Willard F. Hagan, Phoenix, AZ (US); Ronald A. Shields, Mesa, AZ (US)

(73) Assignee: Amsafe, Inc., Mesa, AZ (US)

( * ) Notice: Subject to any disclaimer, the term of this patent is extended or adjusted under 35 U.S.C. 154(b) by 0 days.

(21) Appl. No.: 09/523,875

(22) Filed: Mar. 13, 2000

(51) Int. Cl.$^7$ ................................................ B60Q 1/00
(52) U.S. Cl. ...................... 340/436; 340/438; 280/735; 180/274
(58) Field of Search ................................. 340/436, 438, 340/665, 666, 667, 669; 280/734, 735; 180/273, 274; 307/10.1, 101, 9.1

(56) References Cited

U.S. PATENT DOCUMENTS

| | | | | |
|---|---|---|---|---|
| 3,750,100 A | * | 7/1973 | Ueda | 340/436 |
| 5,570,903 A | * | 11/1996 | Meister et al. | 340/438 |
| 5,610,817 A | * | 3/1997 | Mahon | 180/274 |
| 5,739,757 A | * | 4/1998 | Gioutsos | 340/667 |
| 5,986,355 A | * | 11/1999 | Rosen | 307/101 |

* cited by examiner

*Primary Examiner*—Anh La
(74) *Attorney, Agent, or Firm*—Mayer, Brown, Rowe & Maw

(57) ABSTRACT

An air bag deployment system includes circuitry for preventing the accidental deployment of the air bag during exposure of the system to an excessive external magnetic field. In a first exemplary embodiment of the system, the system includes an accelerometer comprised of first and second Hall effect magnetic devices which are associated with the impact detection circuitry of the deployment system. These are the sensors which would normally trigger deployment of the air bag system upon detection of an impact or acceleration of sufficient magnitude. A sensed magnetic field is used in determining the presence of an acceleration which is of sufficient magnitude to require deployment of the air bag in order to prevent injury to the occupants of a vehicle. The advanced system of the present invention further includes circuitry which senses large external magnetic fields. This sensing circuitry may be comprised of one or more additional Hall effect magnetic sensors which are located preferably outside the magnetic shield that contains the primary circuitry for triggering deployment of the air bag. When these external sensors identify the presence of an external magnetic field of sufficient magnitude, the sensors trigger circuitry which disables the air bag deployment circuit, thereby preventing inadvertent triggering of the deployment mechanism.

11 Claims, 2 Drawing Sheets

AIR BAG HAVING EXCESSIVE EXTERNAL MAGNETIC FIELD PROTECTION CIRCUITRY

BACKGROUND OF THE INVENTION

1. Field of the Invention

The present invention is generally directed to the field of air bag deployment systems. More specifically, the present invention is directed to an automatic air bag deployment system which includes circuitry for preventing an accidental triggering of the air bag deployment system upon the occurrence of an excessive external magnetic field.

2. Description of the Related Art

Air bag deployment systems are generally very well known and have achieved tremendous commercial success in the automobile industry. Air bags for the front passengers in an automobile are standard equipment on most cars throughout the world and many cars are now equipped with side impact air bags as well. More recently, air bag protection systems have been considered for use in transport aircraft.

Conventional air bag deployment systems may include one or more Hall effect magnetic sensors which are used in accelerometers to determine when an air bag should be deployed in order to prevent injury to occupants during a collision. The accelerometers are used to detect extremely rapid acceleration which is associated with a collision. When such an event is detected, the system then deploys the air bag before the occupants impact the interior surfaces of the automobile.

There are a wide variety of ways in which an accelerometer system can be implemented. Conventional systems may employ Hall effect magnetic sensors of some type. In such a system, the Hall effect sensor senses a variation in a magnetic field which, due to the known arrangement of the Hall effect sensor with respect to other structures, signifies a rapid acceleration of the system. When the system detects such an acceleration, it generates an electric signal which is used to trigger deployment of one or more air bags.

One problem with these existing systems is that there is no provision for preventing accidental deployment of the air bag upon the occurrence of an excessive external magnetic field. This is true notwithstanding the fact that air bag deployment systems are subjected to a wide variety of external magnetic fields from a large number of different sources. The wide variety of magnetic fields that are present in the typical environment in which air bag systems are employed include magnetic fields generated by electric power transmission lines, the magnetic field of the earth, as well as numerous other sources.

Although the stronger magnetic fields that are more likely candidates for accidentally triggering a Hall effect accelerometer are generated by electrical currents, the sum effect of the fields from all other magnetic field sources could also trigger such an event. Because the air bag deployment systems rely upon Hall effect sensors, it is possible that one or more magnetic fields which are not associated with an impact event could inadvertently trigger an automatic air bag deployment system.

Injury could occur as a result of inadvertent deployment. The deployment of an air bag due to the fact that the deployment of an air bag is a very rapid event that requires extremely fast expansion of the bag in order to cushion the impact between the occupants and the internal surfaces of the passenger compartment. Therefore it is apparent that inadvertent deployment of the bag should be avoided.

In order to prevent inadvertent deployment of the air bags, the Hall effect sensors are conventionally located within a magnetic field shielding structure or housing. However, because the magnetic shield material is not impervious to magnetic fields, though unlikely, it is still possible that the system could be inadvertently deployed if the system were to encounter a magnetic field of sufficient magnitude. There is currently no known system for preventing an accidental deployment of an air bag upon the occurrence of an excessive external magnetic field. As detailed below, the inventors of the present application have overcome these shortcomings of the prior art. Other objects and advantages of the present invention will be apparent in light of the following Summary and Detailed Description of the Preferred Embodiments.

SUMMARY

The present invention is directed to an air bag deployment system which includes circuitry for preventing the accidental deployment of the air bag during exposure of the system to an excessive external magnetic field. In a first preferred embodiment of the system, the system includes an accelerometer comprised of first and second Hall effect magnetic devices which are associated with the impact detection circuitry of the deployment system. These are the sensors which would normally trigger deployment of the air bag system upon detection of an acceleration of sufficient magnitude. The sensors are conventionally located within a magnetic field shielding structure or housing in order to limit the potential for accidental triggering of the automatic deployment system, During typical operation, these accelerometers sense motion of an object which alters a magnetic field. The sensed magnetic field is thus used in determining the presence of an acceleration which is of sufficient magnitude to require deployment of the air bag in order to prevent injury to the occupants of a vehicle.

The advanced system of the present invention further includes circuitry which senses external magnetic fields. This sensing circuitry may be comprised of one or more additional Hall effect magnetic sensors which are located preferably outside the magnetic shield that contains the primary circuitry for triggering deployment of the air bag. These additional sensors may also be located within the magnetic shield. The preferred external location of the Hall effect magnetic sensors ensures that these sensors will accurately detect the presence of any significant external magnetic field.

This is particularly important when the external magnetic field may be sufficiently high to result in an accidental triggering of the air bag deployment mechanism. Although it is understood that a single Hall effect magnetic sensor may be employed for sensing the presence of an excessive external magnetic field, it is desirable that at least two of the sensors be used at different orientations to ensure that the system will accurately detect the presence of an undesired external magnetic field having any orientation. These additional sensors provide an output with a sufficiently high threshold level to ensure that those magnetic fields which typically exist are not of the sufficient magnitude to result in disabling of the air bag deployment system. Furthermore, once an excessive external magneti field has been detected with this circuitry, the system will not be permanently disabled. (It will be totally disabled only for a finite time. It will reset itself after a brief period of time in order to ensure that the system is working should an actual collision take place.

A variety of different circuits may be employed for disabling the air bag triggering circuit when such an excessive magnetic field is encountered. In a first preferred embodiment, the circuitry is comprised of logic gates arranged to appropriately disable the air bag deployment triggering mechanism upon sensing an excessive external magnetic field. For example, the system may employ an AND gate which receives a first input from the output of the triggering circuitry and a second input which, depending upon convention, will either be the inverted or non-inverted output from the external magnetic field sensing circuitry. This arrangement will ensure that the ultimate output from the AND gate will change states only when a sufficiently high acceleration has been sensed without the presence of an excessively high external magnetic field.

In an alternate embodiment, rather than logic circuitry, a simple switch may be used to provide an open circuit from the output of the air bag deployment triggering circuit. The switch is used to cause an open circuit condition on the signal line which travels from the air bag deployment trigger signal generating circuit to the actual air bag deployment mechanism. Depending upon convention, the output from the switch will be held either at a low condition or a high condition through a resistor which is either connected to ground or a High logic level voltage as is generally known in the art in order to ensure that the signal line does not inadvertently float to a level which would result in deployment of the air bag. The external magnetic field sensing circuitry is connected to the switch to open the switch when an excessive magnetic field is present.

In yet another alternate embodiment of the present invention, the excessive external magnetic field sensing circuitry provides an interrupt signal to a microprocessor which controls the actual air bag deployment system. Upon receipt of this interrupt signal, the air bag deployment signal system will become disabled for a predetermined period of time. This delay may be programmed into the system and may be virtually any fixed length period of time.

DETAILED DESCRIPTION OF THE PREFERRED EMBODIMENTS

Figure 1:
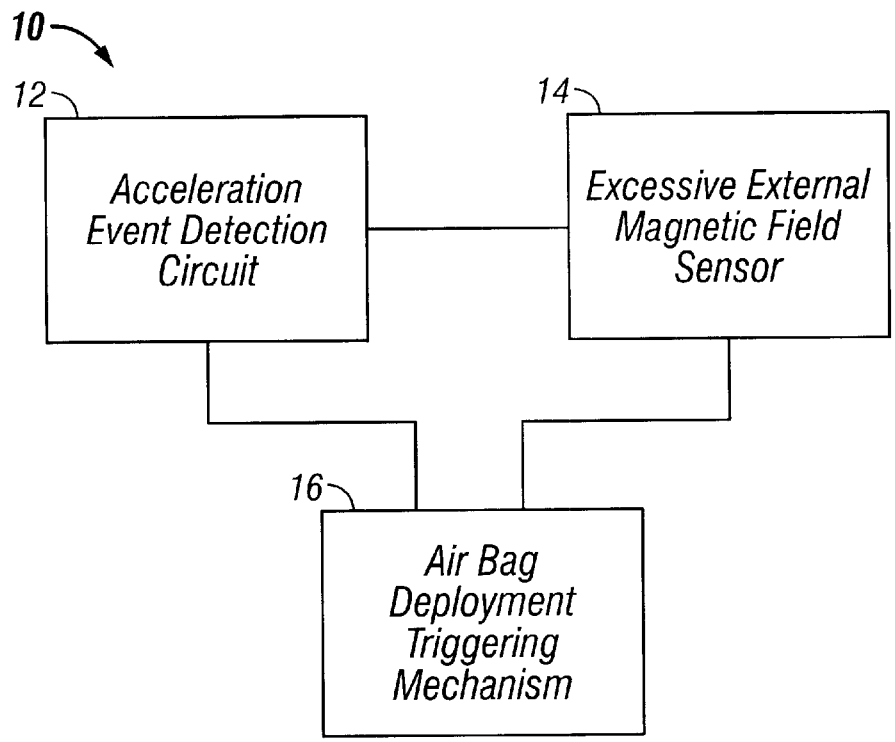
FIG. 1 illustrates a first exemplary embodiment of the system of the present invention.

FIG. 1 illustrates a first preferred embodiment of the air bag deployment inadvertent trigger prevention circuitry which is shown generally at 10. The system includes an acceleration event detection circuit 12 and excessive external magnetic field sensor 14. The acceleration event detection circuit 12 and the excessive external magnetic field sensor 14 are each connected to the air bag deployment triggering mechanism 16. Additionally, a further connection may be made between the acceleration event detection circuit 12 and the excessive external magnetic field sensor 14. These connections facilitate disabling the air bag deployment triggering mechanism 16 or alternatively preventing the air bag deployment triggering mechanism 16 from receiving a trigger signal. Alternatively, both disabling the air bag deployment triggering mechanism 16 from receiving a trigger signal and preventing a trigger signal from reaching the air bag deployment triggering mechanism 16 may be used. More specific detail regarding operation of these elements is set forth below.

Figure 2:
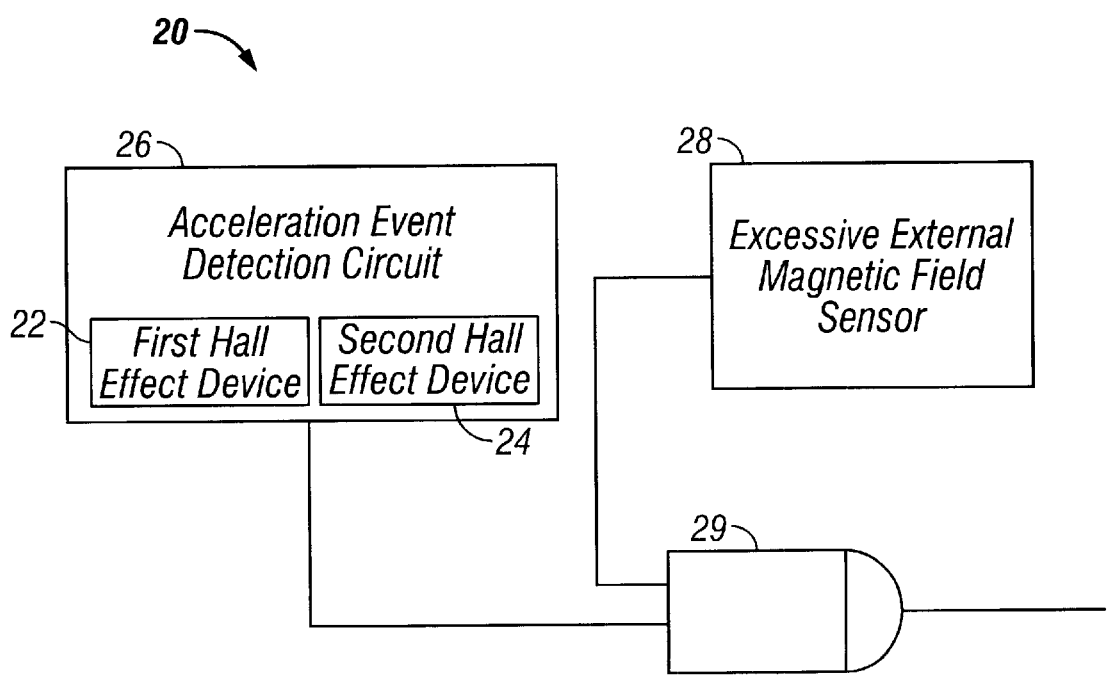
FIG. 2 illustrates an exemplary embodiment of the present invention that employs conventional logic circuitry.

FIG. 2 illustrates an exemplary embodiment of the invention wherein the acceleration event detection circuit is comprised of first and second Hall effect magnetic devices 22, 24 which are located within an external magnetic shield protection member 26. During typical operation, these Hall effect devices sense motion of an object which alters a magnetic field. The sensed magnetic field is thus used in determnining the presence of an acceleration which is sufficiently high to merit deployment of the air bag. The advanced system of the present invention further includes an excessive external magnetic field sensor 28. This sensing circuitry 28 may be comprised of one or more additional Hall effect magnetic sensors which are located preferably outside of the magnetic shield housing 26 that contains the primary circuitry for deployment of the air bag. The preferred external location of the Hall effect magnetic sensors 28 ensures that these sensors will accurately detect the presence of any significant external magnetic field which could potentially trigger deployment of the air bag independent of an acceleration event. Although it is understood that a single Hall effect magnetic sensor may be employed for excessive external magnetic field sensor 28, it is desirable that at least two sensors be used at different orientations to ensure that the system will accurately detect the presence of an undesired external magnetic field. The external magnetic shield sensors 28 provide an output with a sufficiently high threshold level to ensure that ambient magnetic fields which typically exist are not of sufficient magnitude to result in undesired suppression of the air bag deployment system. Thus, the output of the excessive external field sensor 28 will only change states if the field is above the predetermined threshold level.

As noted, a variety of different circuits may be employed for disabling the air bag triggering circuitry when such an excessive magnetic field is encountered. In one exemplary embodiment shown in FIG. 2, the system 20 is comprised of a logic gate 29 arranged to -appropriately disable the air bag deployment triggering mechanism upon sensing of an excessive external magnetic field. For example, as shown in FIG. 2, the system may employ a logical AND gate 29 which receives a first input from the output of the acceleration event detection circuit and a second input which, depending upon convention, will be the inverted or non-inverted output from the external excessive magnetic field sensor or sensors 28. This will ensure that the ultimate output from the triggering circuitry will change states only when a sufficiently high acceleration has been sensed in the absence of an excessively high external magnetic field. Depending upon convention. a pull up or pull down resistor may be connected to the output of the logic gate 29 in order to ensure that the gate only changes states to provide a trigger signal when desired.

Figure 3:
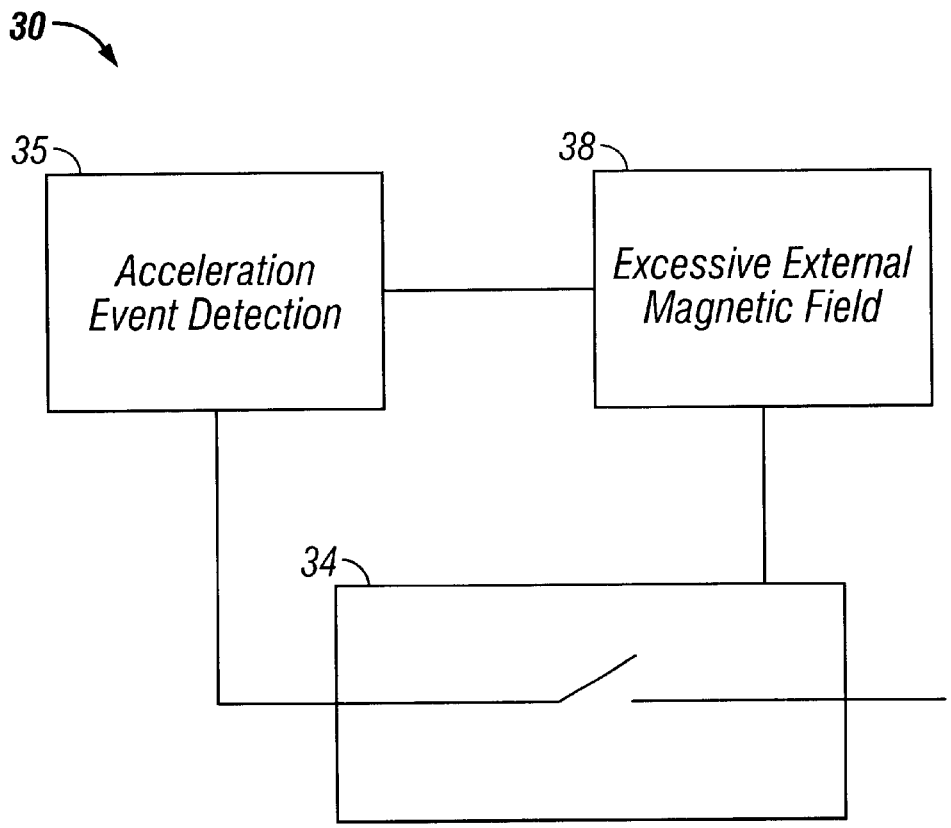
FIG. 3 illustrates an exemplary embodiment of the present invention that employs a switch.

As shown in FIG. 3, in an alternate embodiment, rather than logic circuitry, a simple switch may be used to provide an open circuit from the output of the acceleration event detection circuit. For example, as shown in FIG. 3, the system 30 may employ a switch 34 which receives an input from the output of the acceleration event detection circuit 35 and a switch control signal is provided by the inverted or non-inverted output from the external excessive magnetic field sensor or sensors 38. This will ensure that the ultimate output from-the triggering circuitry will change states only when a sufficiently high acceleration has been sensed in the absence of an excessively high external magnetic field.

Figure 4:
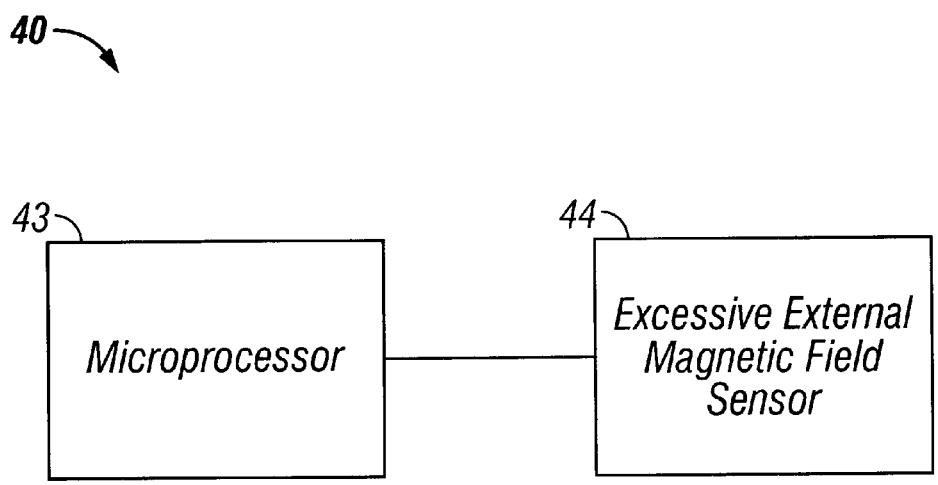
FIG. 4 illustrates an exemplary embodiment of the present invention that employs a microprocessor.

As shown in FIG. 4, in an alternate embodiment, a microprocessor interrupt may be used to prevent inadvertent triggering of the air bag deployment mechanism. In such a design, the system 40 employs a deployment system microprocessor 43 that is connected to the excessive external magnetic field sensor 44. The excessive external magnetic field sensor 44 would provide an interrupt signal to the microprocessor which would be programmed to prevent deployment of the air bag for a predetermined period of time when such an event occurs. It is also contemplated that two of these systems could be combined in order to prevent accidental deployment of an air bag. For example, a microprocessor interrupt could be provided in conjunction with preventing a trigger signal from passing to the actual deployment mechanism as in the previous embodiments.

The present invention is subject to many variations, modifications, and changes in detail. It is intended that the subject matter described throughout the specification and the accompanying drawings be considered illustrative only. Accordingly, it is intended that the invention be limited only by the spirit and scope of the appended claims.

We claim:

1. A method for controlling an air bag deployment system comprising the steps of:

sensing an external magnetic field; and preventing the air bag deployment system from deploying an air bag if the sensed external magnetic field is greater than a threshold value;

wherein the external magnetic field is not caused by a magnet introduced to the system by a user.

2. The method of claim 1, wherein the step of preventing comprises applying an output from an acceleration event detection circuit to a logic gate with an output that is a trigger signal for the deployment system and wherein the logic gate will not change states if an excessive external magnetic field is detected in said step of sensing an external magnetic field.

3. The method of claim 1, wherein the step of preventing comprises applying an output from an acceleration event detection circuit to a switch with an output that is a trigger signal for the deployment system and wherein the switch is opened if an excessive external magnetic field is detected in said step of sensing an external magnetic field.

4. The method of claim 1, wherein the step of preventing comprises applying an output from an excessive external magnetic field sensor to a microprocessor that controls the deployment system.

5. An air bag deployment system comprising:

an external magnetic field sensor;

an acceleration event detection circuit; and an air bag deployment trigger circuit, wherein an output from the external magnetic field sensor disables the air bag deployment trigger signal; and wherein the external magnetic field is not caused by a magnet introduced to the system by a user.

6. An air bag deployment system comprising:

an external magnetic field sensor;

an acceleration event detection circuit; and an air bag deployment trigger circuit, wherein an output from the external magnetic field sensor prevents an output signal from the acceleration event detection circuit from changing states; and wherein the external magnetic field is not caused by a magnet introduced to the system by a user.

7. The air bag deployment system of claim 6, wherein an output from the external magnetic field sensor and an output from the acceleration event detection circuit are connected to a logic gate.

8. The air bag deployment system of claim 6, wherein an output from the external magnetic field sensor is a switch control signal and an output from the acceleration event detection circuit is an input to the switch.

9. A method for controlling an air bag deployment system comprising the steps of:

sensing an external magnetic field; and preventing the air bag deployment system from deploying an air bag if the sensed external magnetic field is greater than a threshold value;

wherein the threshold value is at least large enough to trigger deployment of the air bag.

10. An air bag deployment system comprising:

an external magnetic field sensor;

an acceleration event detection circuit; and an air bag deployment trigger circuit, wherein an output from the external magnetic field sensor disables the air bag deployment trigger signal when said output exceeds a threshold value at least large enough to trigger deployment of an air bag.

11. An air bag deployment system comprising:

an external magnetic field sensor;

an acceleration event detection circuit; and an air bag deployment trigger circuit, wherein an output from the external magnetic field sensor prevents an output signal from the acceleration event detection circuit from changing states when said output exceeds a threshold value at least large enough to trigger deployment of an air bag.

* * * * *